United States Patent
Scholtes

(10) Patent No.: US 11,859,502 B2
(45) Date of Patent: Jan. 2, 2024

(54) VARIABLE-PITCH STATOR VANE COMPRISING AERODYNAMIC FINS

(71) Applicant: SAFRAN AIRCRAFT ENGINES, Paris (FR)

(72) Inventor: Christophe Scholtes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/754,606

(22) PCT Filed: Oct. 1, 2020

(86) PCT No.: PCT/FR2020/051723
§ 371 (c)(1),
(2) Date: Apr. 7, 2022

(87) PCT Pub. No.: WO2021/069817
PCT Pub. Date: Apr. 15, 2021

(65) Prior Publication Data
US 2022/0389829 A1    Dec. 8, 2022

(30) Foreign Application Priority Data

Oct. 10, 2019 (FR) ...................................... 1911232

(51) Int. Cl.
*F01D 17/16* (2006.01)

(52) U.S. Cl.
CPC ........ *F01D 17/16* (2013.01); *F05D 2220/323* (2013.01); *F05D 2240/128* (2013.01); *F05D 2260/60* (2013.01)

(58) Field of Classification Search
CPC .......... F01D 17/16; F01D 17/162; F01D 9/02; F01D 9/04; F01D 9/041; F01D 9/042; F01D 5/145; F05D 2240/127; F05D 2240/128; F05D 2260/60; F05D 2220/323; F04D 29/563
See application file for complete search history.

(56) References Cited

U.S. PATENT DOCUMENTS 6,283,705 B1    9/2001  Rice et al.
9,488,064 B2*  11/2016 Perrot ................. F04D 27/0246
10,287,902 B2   5/2019  Sak et al.
(Continued)

FOREIGN PATENT DOCUMENTS

FR    2432608 A1    2/1980

OTHER PUBLICATIONS

FR2432608_MachineTranslation (Riollet, G.) Feb. 29, 1980. [retrieved on Apr. 5, 2023] Retrieved from: Espacenet (Year: 1980).*
(Continued)

*Primary Examiner* — Elton K Wong
(74) *Attorney, Agent, or Firm* — Pearne & Gordon LLP

(57) ABSTRACT

A variable-pitch stator vane for a turbine engine compressor stator, extending in a longitudinal radial plane including a radially inner plate and a radially outer plate between which at least one blade extends, each plate including a transverse longitudinal wall facing the other plate, characterised in that the transverse longitudinal wall of at least one plate includes at least one fin protruding radially towards the other plate.

11 Claims, 3 Drawing Sheets

(56) References Cited

U.S. PATENT DOCUMENTS

| | | |
|---|---|---|
| 2012/0128480 A1 | 5/2012 | Gomez et al. |
| 2015/0275916 A1 | 10/2015 | Marshall et al. |
| 2017/0191367 A1* | 7/2017 | Sak .................. F01D 9/041 |
| 2020/0308974 A1* | 10/2020 | Hosaka ............. F04D 29/687 |

OTHER PUBLICATIONS

Search Report issued in French Patent Application No. 1911232 dated Apr. 30, 2020.
International Search Report for issued in Application No. PCT/FR2020/051723 dated Dec. 9, 2020.
Written Opinion for PCT/FR2020/051723 dated Dec. 9, 2020.

* cited by examiner

VARIABLE-PITCH STATOR VANE COMPRISING AERODYNAMIC FINS

This is the National Stage of PCT international application PCT/FR2020/051723, filed on Oct. 1, 2020 entitled "VARIABLE-PITCH STATOR VANE COMPRISING AERODYNAMIC FINS", which claims the priority of French Patent Application No. 1911232 filed Oct. 10, 2019, both of which are incorporated herein by reference in their entireties.

TECHNICAL FIELD

The invention relates to a turbine engine stator vane, particularly a compressor stator vane, which is configured to reduce vortex formation at the vane root or head.

PRIOR ART

A turbine engine compressor stage is composed of a plurality of mobile vanes mounted on a rotor and a plurality of stationary vanes, distributed about the main axis of the compressor, which form a stator.

The stator is intended to rectify an air flow circulating in the primary jet, before it comes into contact with an impeller.

With a view to improving the performance of the compressor, it is important to control the aerodynamic losses which are generated in the air flow through the compressor. Of the aerodynamic losses, some are generated by secondary air flows, taking the form of vortices.

As can be seen by way of example in FIG. 3, some vortices 10, known as corner vortices, result from the interaction between the boundary layer flowing along the blade 12 of a vane 14 with the boundary layers flowing along a plate 16 of the vane 14.

Also, some stator stages include variable-pitch stator vanes, commonly referred to using the acronym "VSV" for "Variable Stator Vane", for which the orientation of each vane 14 of this stage, about the main axis thereof is capable of being modified by a suitable mechanism.

The aim of the invention is that of proposing a stator vane for a turbine engine compressor which is produced to limit the formation of these corner vortices.

DESCRIPTION OF THE INVENTION

The invention relates to a variable-pitch stator vane for a turbine engine compressor stator, which extends in a longitudinal radial plane including a radially inner plate and a radially outer plate between which at least one blade extends, each plate including a transverse longitudinal wall facing the other plate, characterised in that said transverse longitudinal wall of at least one plate includes at least one fin projecting radially towards the other plate.

The presence of the fins helps break the vortices forming at the connection between the blade and each plate.

Preferably, said transverse longitudinal wall includes several fins distributed transversally on either side of the blade.

Preferably, each fin is substantially parallel with the blade and is located transversally at a distance from the blade.

Preferably, the blade includes a first upstream longitudinal end edge known as the leading edge and a second downstream longitudinal end edge known as the trailing edge, and each fin includes an upstream longitudinal end longitudinally offset downstream in relation to the leading edge.

Preferably, the longitudinal distance between the upstream longitudinal end of each fin and the leading edge is at least equal to 30% of the longitudinal length of the plate. Preferably, each fin includes a radial end face which is flush with the transverse longitudinal wall of the plate at the upstream longitudinal end of the fin.

Preferably, the plate includes a peripheral face extending radially from the peripheral edge of the transverse longitudinal wall, and each fin includes a radial end face which is flush with the peripheral face of the plate at the downstream longitudinal end of the fin. Preferably, the cross-section of each fin, along a transverse longitudinal plane is rectilinear.

Preferably, the cross-section of each fin, along a transverse longitudinal plane is curved and has a similar curvature to the curvature of the blade.

Preferably, the maximum radial dimension of each fin is less than 25% of the radial distance between the transverse longitudinal walls of the plates.

The invention also relates to an aircraft turbine engine compressor including a stator formed from a plurality of vanes according to the invention, distributed about a main axis A of the compressor, with the blades thereof radially oriented in relation to the main axis A of the compressor, characterised in that each blade is movably mounted in rotation about the radial main axis thereof.

DESCRIPTION OF EMBODIMENTS

For the description of the invention, the radial, longitudinal and transverse orientations according to the reference R, L, T indicated in the figures will be adopted in a non-limiting manner.

Figure 1:
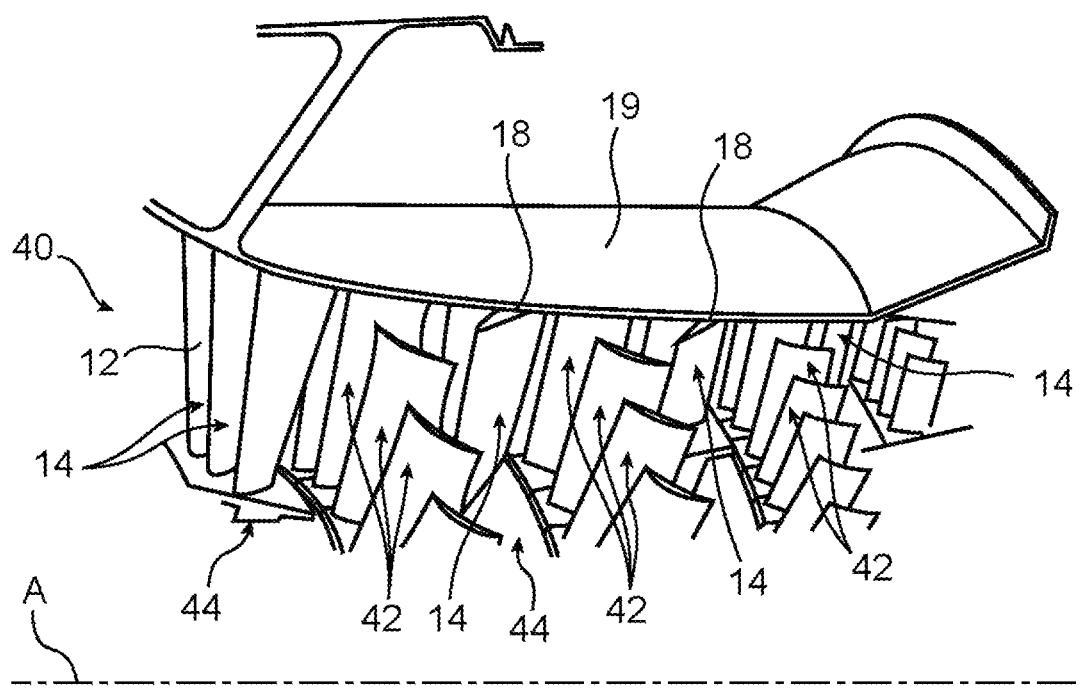
FIG. 1 is a schematic perspective representation of a turbine engine compressor comprising variable-pitch stator vanes.

FIG. 1 represents a part of a turbine engine, particularly a high- or low-pressure compressor. This compressor 40 has a main axis A extending along the main longitudinal direction of the turbine engine.

The compressor 40 includes several stages each of which includes a set of mobile vanes 42 borne by a rotor disk and a plurality of stator vanes 14 forming a stator 44 intended to redirect the air flow along the main axial direction of the compressor.

The main orientation of each blade 14 of the stator 44 is radial in relation to the main axis A of the compressor 40, i.e. each vane extends along the radial direction R perpendicular to the longitudinal direction L.

It will be understood that the vane can be slightly inclined in relation to the radial direction R, due to the local inclination of the air flow jet wherein the vane 14 is located. The stator 44 is of the variable-pitch type, i.e. each stator vane 14 is pivotally movable about the main axis thereof, which extends here along the radial direction R, to modify the inclination thereof in relation to a plane defined by the longitudinal direction L and the radial direction R of the vane 14, i.e. in relation to the overall flow direction of the air flow in the compressor 40. It will be understood that not all the stator vanes 14 of the turbine engine are variable-pitch. Thus, only the stator vanes 14 of the first stages of the compressor 40 are mobile, the vanes forming the other stators are stationary in the stator.

In the following description, reference will solely be made to a mobile vane 14, i.e. a variable-pitch vane. Consequently, the term vane 14 will solely be used to describe this mobile vane 14.

It will be understood that when the vane 14 is pivoted in the compressor 40, the reference R, L, T which is associated therewith pivots in the same way about the radial direction R.

Figure 2:
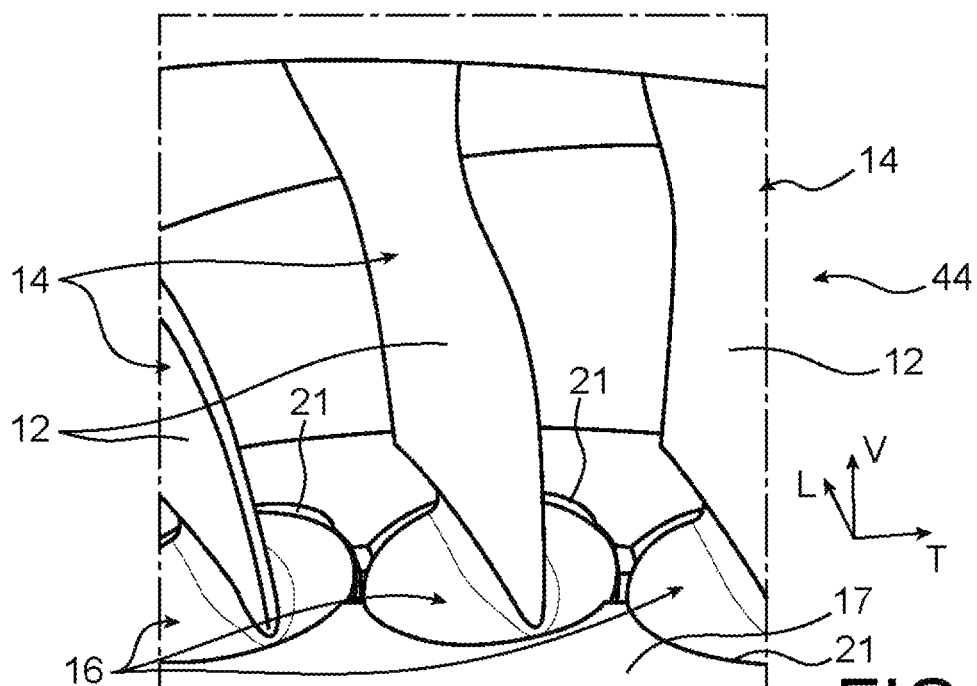
FIG. 2 is a larger-scale detailed view of a part of the compressor represented in FIG. 1, showing certain variable-pitch vanes.
Figure 3:
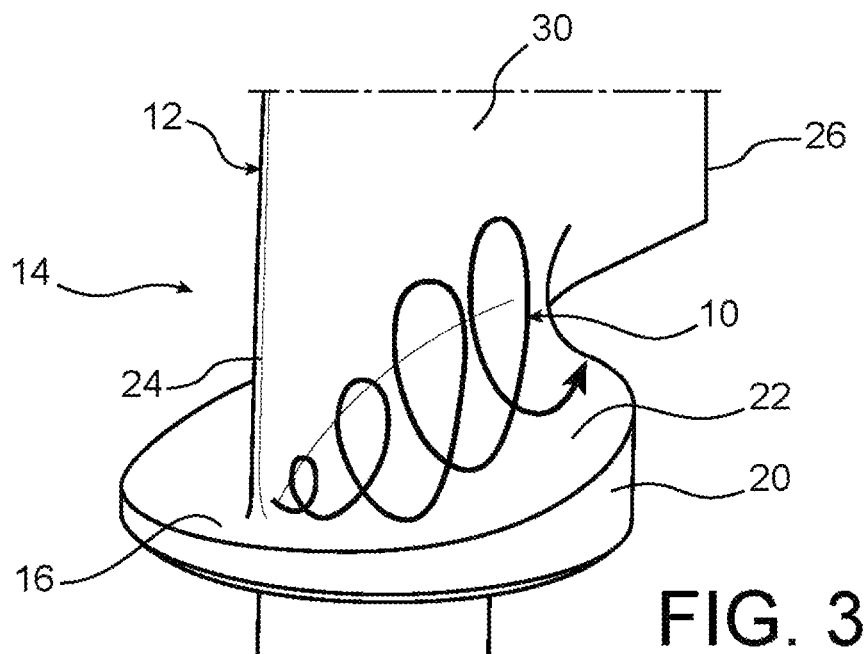
FIG. 3 is a detailed view of an end of a variable-pitch vane according to the prior art, showing vortex formation at the connection between the blade and a plate.

As can be seen in more detail in FIG. 2, each vane 14 includes a radially inner plate 16 which delimits, with a stationary wall 17 of the compressor 40, the radially inner part of the air flow jet.

The vane 14 also includes a radially outer plate 18 (seen in FIG. 1), which delimits, with a stationary wall 19 of the compressor 40, the radially outer part of the air flow jet. Since the vane 14 is a variable-pitch vane, each plate 16, 18 is in the main form of a disk coaxial with the radial axis of rotation of the vane 14 in relation to the stationary platforms of the compressor.

Each plate 16, 18 includes an annular peripheral wall 20 which is centred on the radial axis of rotation and which is located in a complementary circular orifice 21 formed in the associated stationary platform.

Each plate 16, 18 also includes a transverse longitudinal wall 22 which extends essentially longitudinally and transversally and which faces the other plate 16, 18.

Each transverse longitudinal wall 22 extends essentially in the extension of the annular wall of the association platform, to reconstitute the air flow jet.

The vane 14 includes a blade 12 which extends along the main axis of the vane 14, i.e. here in the radial direction R between the two plates 16, 18.

The blade 12 includes an upstream longitudinal end edge 24 commonly referred to as the leading edge, a downstream longitudinal end edge 26 commonly referred to as the trailing edge, a lower surface wall 28 and an upper surface wall 30 which transversally delimit the blade 12 and which extend longitudinally between the leading edge 24 and the trailing edge 26 and radially between the two transverse longitudinal walls 22 of the plates 16, 18.

Figure 4:
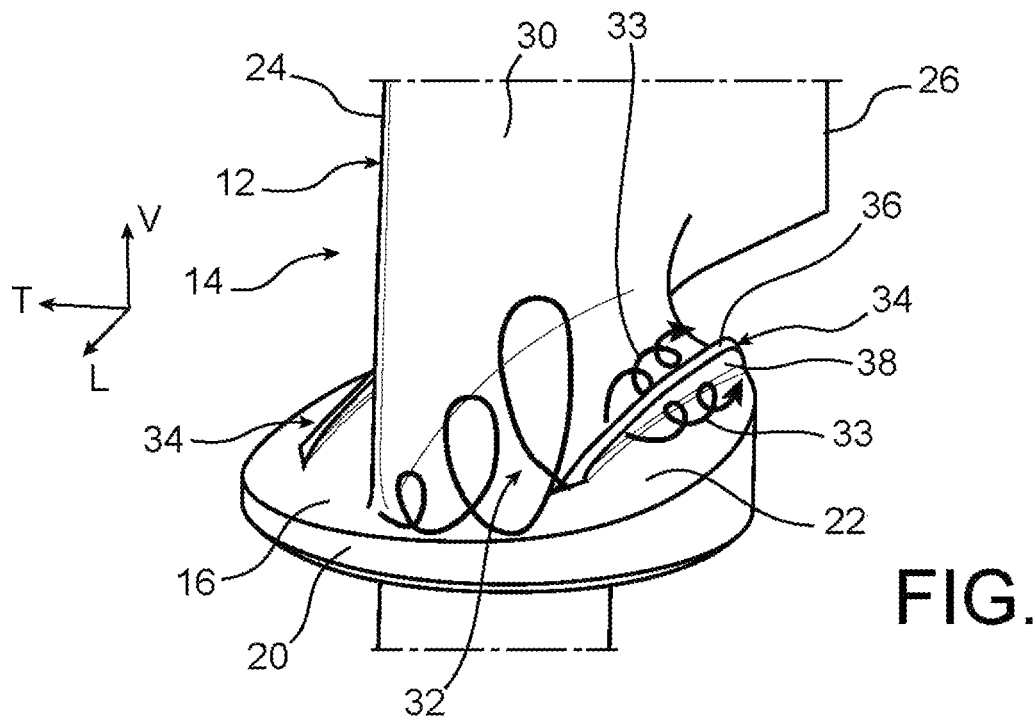
FIG. 4 is a similar view to that of FIG. 3, representing a vane according to the invention.

During the operation of the turbine engine, and as can be seen in FIG. 4, the air flow in the jet produces disturbances 32 at the connection between each end of the blade 12 and the transverse longitudinal wall 22 of a plate 16, 18, i.e. at the connection between the lower surface wall 28 or the upper surface wall 30 with the transverse longitudinal wall 22 of a plate 16, 18. Here, only the disturbances between the upper surface wall 30 and the transverse longitudinal wall 22 of the radially inner plate 16 have been represented.

These disturbances 32, which take the form of vortices, tend to increase along the flow direction, i.e. from upstream to downstream, i.e. they are greater on approaching the trailing edge of the blade 12.

Figure 5:
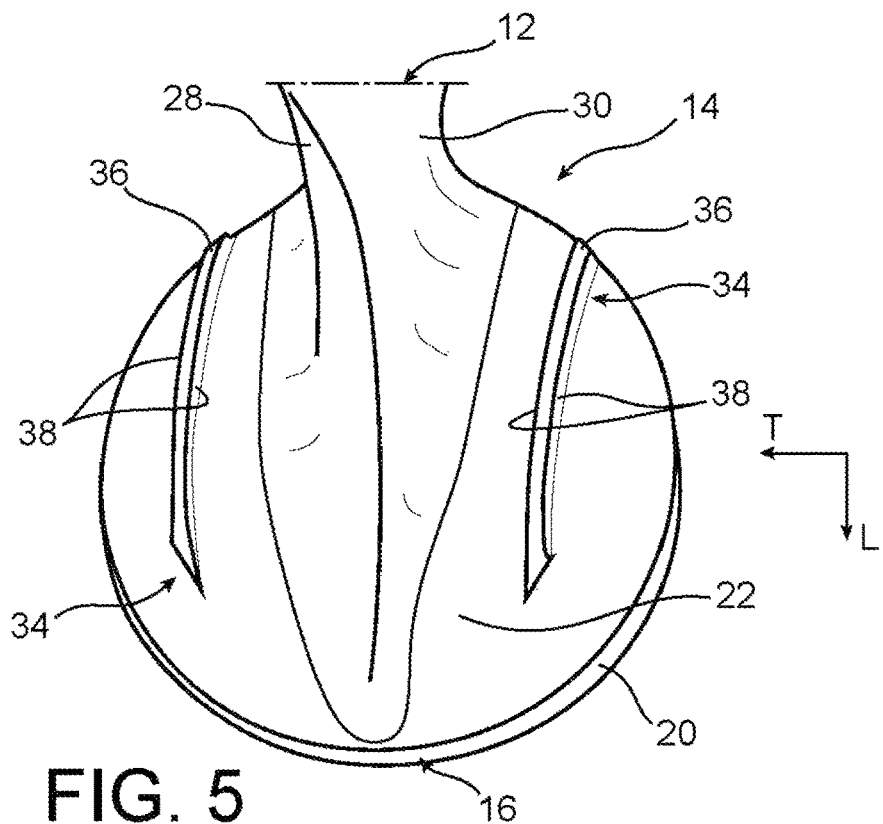
FIG. 5 is a top view of the vane part represented in FIG. 4, showing two fins on the plate.
Figure 6:
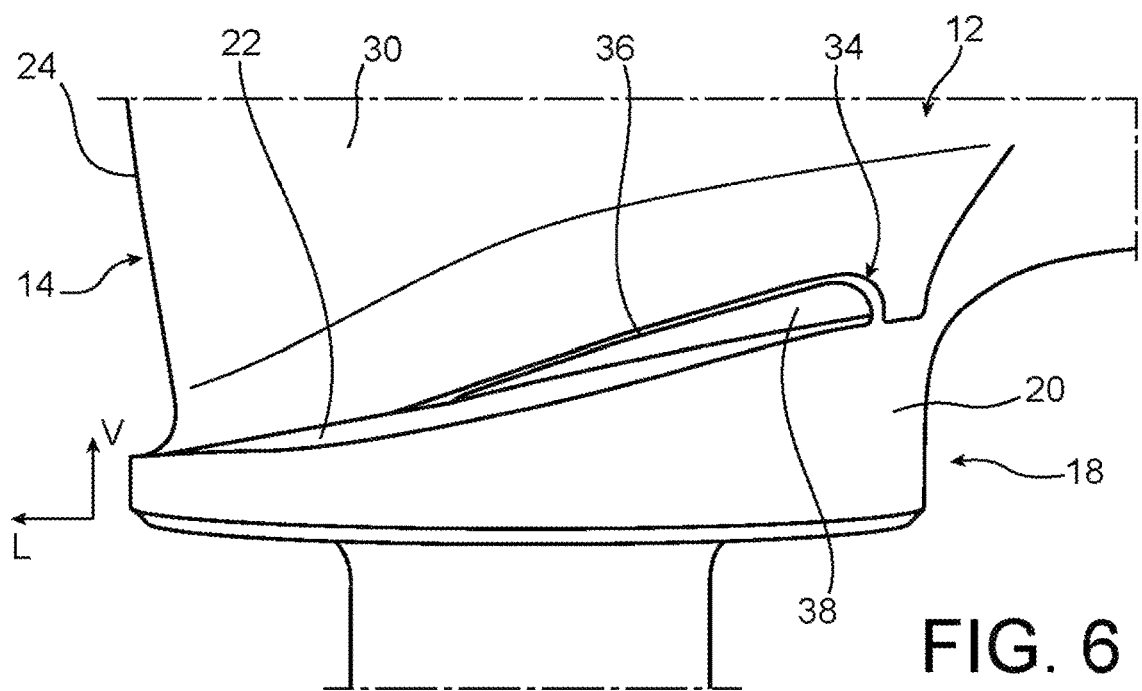
FIG. 6 is a side view of the vane represented in FIGS. 4 and 5.

To limit the expansion of the disturbances 32 in the downstream direction, and as can be seen in FIGS. 4 to 6, each transverse longitudinal wall 22 of a plate 16, 18, includes at least one fin 34 which extends by protruding in relation to said transverse longitudinal wall 22 along the radial direction.

The fin 34 forms an obstacle to the vortex flow formed at the plate 16, preventing the disturbance 32 from growing further, or even inducing the formation of several disturbances 33 of lesser amplitude.

According to a preferred embodiment represented in the figures, the transverse longitudinal wall 22 of the plate 16 includes two fins 34 which are distributed transversally on either side of the blade 12. It will be understood that the invention is not limited to this embodiment, and that a different number of fins 34 can be disposed on either side of the blade 12.

Each fin 34 extends substantially parallel with the blade 12, i.e. in a plane parallel with the longitudinal L and vertical V directions in the embodiment represented in the figures.

The fin is located transversally facing the lower surface wall 28 or the upper surface wall 30 and it extends transversally away from this wall 28, 30 of the blade 12.

The cross-section of each fin 34 along a transverse longitudinal plane can be rectilinear, or curved, and in this case, the curvature of the fin 34 is similar to the curvature of the lower surface wall 28 or the upper surface wall 30, beside which the fin 34 is located. Thus, in the latter case, the fin 34 follows the flow direction of the air flow in the stator.

Each fin 34 is delimited by a radial end face 36 and two lateral faces 38 which are separated from one another by the radial end face 36. The cross-section of the fin 34 along a transverse radial plane, i.e. along the directions R, T is thus substantially rectangular.

According to an alternative embodiment, the sharp angles of the ridges of each fin 34 are replaced by fillets, thus forming a fin 34 with rounded edges.

The lateral faces are preferably parallel with one another and parallel with the radial direction R of the vane 14.

The radial dimension of the fin 34 is variable and increasing along the longitudinal direction. The radial end face 36 is preferably rounded along the radial direction. Preferably, the maximum radial dimension of each fin is less than 25% of the radial dimension of the blade 12, i.e. less than 25% of the radial distance between the transverse longitudinal walls 22 of the plates 16, 18.

This radial dimension is sufficient to combat the vortices, which are of the same order of dimension as this radial dimension, without overly affecting the flow elsewhere.

The radial end face 36 is flush with the transverse longitudinal wall 22 of the plate 16 at the upstream longitudinal end of the fin 34. This makes it possible to avoid having an "upward step" effect, which would be detrimental for the performance of the turbine engine.

Furthermore, as can be seen in FIG. 6, at the downstream longitudinal end of the fin 34, i.e. at the downstream end of the fin (34), the radial end face 36 is curved to extend essentially radially and be flush with the peripheral wall 20 of the plate 16.

Thus, at each of the longitudinal ends thereof, the radial end face 36 is flush with, or extends from the transverse longitudinal wall 22 or the peripheral wall 20 of the plate 16. There is then no disengagement between the radial end face 36 of the fin 34 and the transverse longitudinal wall 22 or the peripheral wall 20 of the plate 16, which makes it possible to prevent the formation of additional vortices which could be detrimental to the performances of the vane 14.

In order to limit the disturbances in the air liable to be produced by a fin, the upstream longitudinal end of each fin 34 is longitudinally offset downstream in relation to the leading edge 24 of the blade 12.

Preferably, this longitudinal offset downstream is at least equal to 30% of the longitudinal length of the plate 16.

The zone located at the leading edge 24 of the blade 12 is a zone wherein the air flow is not completely oriented parallel with the vane. An aerodynamic blocking zone (with high Mach) can appear in the vicinity of the leading edge 24 for certain working points, therefore, projections should be avoided in this zone.

As stated above, the vane 14 is movable in rotation in relation to the compressor stator about a radial axis.

As the fins 34 are mounted on the plate 16, the fins 34 are also movable in rotation integrally with the vane 14, ensuring satisfactory rectification efficiency of the air flow in the compressor and the reduction of the disturbances 32 commonly referred to as "corner vortices".

According to a preferred embodiment, each fin 34 is made of one piece with the plate 16 which is associated therewith.

This embodiment can be by moulding or any other embodiment, such as for example by additive technology.

The description given above for one or two fins applies to the fins which are borne by the plate 16 located at the radially inner end of the blade 12. It will be understood that this description will apply in the same way for each fin 34 which is borne by the plate 18 located at the radial outer end of the blade 12.

What is claimed is:

1. A variable-pitch stator vane for a turbine engine compressor stator, which extends in a longitudinal radial plane including a radially inner plate and a radially outer plate between which at least one blade extends,
    each plate including a transverse longitudinal wall facing the other plate,
    wherein said transverse longitudinal wall of at least one plate includes at least one fin protruding radially towards the other plate.

2. The vane according to claim 1, wherein said transverse longitudinal wall includes several fins distributed transversally on either side of the blade.

3. The vane according to claim 1, wherein each fin is substantially parallel with the blade and is located transversally at a distance from the blade.

4. The vane according to claim 1, wherein the blade includes a first upstream longitudinal end edge referred to as the leading edge and a second downstream longitudinal end edge referred to as the trailing edge, and
    wherein each fin includes an upstream longitudinal end longitudinally offset downstream in relation to the leading edge.

5. The vane according to claim 4, wherein a longitudinal distance between the upstream longitudinal end of each fin and the leading edge is at least equal to 30% of a longitudinal length of the at least one plate.

6. The vane according to claim 1, wherein each fin includes a radial end face which is flush with the transverse longitudinal wall of the at least one plate at an upstream longitudinal end of the fin.

7. The vane according to claim 1, wherein the at least one plate includes a peripheral face extending radially from a peripheral edge of the transverse longitudinal wall, and
    wherein each fin includes a radial end face which is flush with the peripheral face of the at least one plate at a downstream longitudinal end of the fin.

8. The vane according to claim 1, wherein a cross-section of each fin, along a transverse longitudinal plane is rectilinear.

9. The vane according to claim 1, wherein a cross-section of each fin, along a transverse longitudinal plane is curved.

10. The vane according to claim 1, wherein a maximum radial dimension of each fin is less than 25% of a radial distance between the transverse longitudinal walls of the plates.

11. An aircraft turbine engine compressor including a stator formed from a plurality of vanes according to claim 1, distributed about a main axis of the compressor, with the blades thereof radially oriented in relation to the main axis of the compressor,
    wherein each blade is movably mounted in rotation about an axis thereof that extends in a radial direction in relation to the main axis of the compressor.

* * * * *